United States Patent [19]
Holty et al.

[11] 3,945,843
[45] Mar. 23, 1976

[54] ACRYLIC ACID COPOLYMER AS PIGMENT DISPERSANT

[75] Inventors: David W. Holty; George E. Lauterbach, both of Naperville, Ill.

[73] Assignee: Nalco Chemical Company, Oak Brook, Ill.

[22] Filed: July 22, 1974

[21] Appl. No.: 490,628

[52] U.S. Cl............ 106/308 M; 106/306; 106/300
[51] Int. Cl.²........................ C09C 3/00; C09C 1/02
[58] Field of Search........... 106/308 Q, 308 M, 306; 260/86.1 E, 86.1 R

[56] References Cited
UNITED STATES PATENTS

| | | | |
|---|---|---|---|
| 3,413,255 | 11/1968 | Gordon et al. | 106/308 Q |
| 3,453,360 | 7/1969 | Hill | 106/308 Q |
| 3,661,610 | 5/1972 | Ferris | 106/306 |
| 3,674,529 | 7/1972 | Loms | 106/306 |

*Primary Examiner*—Winston A. Douglas
*Assistant Examiner*—J. V. Howard
*Attorney, Agent, or Firm*—John G. Premo; Edward A. Ptacek

[57] ABSTRACT

An improved method for rapidly dispersing high solids suspensions, such as calcium carbonate slurries, using a copolymer of methyl acrylate and acrylic acid alone or along with sodium polyphosphates is disclosed.

8 Claims, No Drawings

ACRYLIC ACID COPOLYMER AS PIGMENT DISPERSANT

Although paper is manufactured essentially from wood pulp, various inert inorganic substances are added for such purposes as improved printability and improved opacity. Pigments for example are usually added to improve the color of the finished product. These paper additives are used to improve the quality of the finished paper and/or to reduce its cost. Although calcium carbonate is not inert, it is one of the most widely used of the above mentioned paper additives, either alone or with other additives. The use of calcium carbonate as a paper pigment is widely known to those skilled in the art.

However, there are some problems in the use of pigments such as calcium carbonate. In order to be economical and time saving, high solids suspensions of calcium carbonate must be used. Usually, the high solids suspensions had a high viscosity. A method was needed to achieve a high solids suspension with a low viscosity. Dispersion is usually obtained through a combination of chemical action and mechanical shear. Dispersing agents act on the surface forces of the pigment particle to reduce them to a condition which will produce free particle movement of the pigment itself.

It has been found generally that the inorganic polyphosphate compounds are the most effective dispersants for the paper additives, such as, calcium carbonate. Other inorganic compounds such as silicates are much less effective. The best dispersant as well as the optimum concentration may vary between various paper additives. In addition to these inorganic dispersing agents, organic polyacrylates have also been used in the past. Nevertheless there is a need for a more effective dispersant. A general dispersant could also have uses in other industrial applications where a high solids suspension is present, such as in cement, mineral slurries and other slurries.

OBJECTS

It is an object of this invention to provide an improved method of dispersing high solids suspensions. It is a further object to provide an improved method for rapidly dispersing high solids suspensions. Still another object is to provide an improved method of reducing the viscosity of high solids suspensions. Other objects will appear hereafter.

THE INVENTION

The invention comprises a method for rapidly dispersing high solids suspensions by adding small amounts of a dispersant formed by the copolymerization of methyl acrylate and acrylic acid. The high solids suspensions could be paper coating pigments such as calcium carbonate, clay, titanium dioxide; cement; mineral slurries used in the mining industry; and other high solids suspensions commonly in use in industry. These slurries are prepared at various solids concentrations, but typically are within the range of 50 – 80% solids by weight.

These methyl acrylate-acrylic acid copolymers show dispersion properties in high solid suspensions in addition levels as low as 0.2 percent by weight based on the weight of the dry pigment. Generally, the dispersant is added in a concentration range of from 0.2 to 1.4% by weight of the dispersant based on the weight of the dry pigment. However, this range may be increased or decreased depending on the paper filler and conditions of the particular system involved. The dispersant usually contains about 33% copolymer by weight and the rest is solvent. Therefore, 0.2 percent by weight of dispersant really means dispersant solution containing about 33% copolymer. Thus, 0.2 percent by weight dispersant would mean 0.067% by weight of copolymer and 0.133% by weight solvent.

In accordance with the invention, the copolymer of methyl acrylate and acrylic acid has been discovered to exhibit unique properties in dispersing high solids suspensions. These copolymers typically have low molecular weights, generally within the range of from 5,000 to 15,000. A preferred molecular weight range is between 10,000 to 15,000. The weight ratio of methyl acrylate to acrylic acid in the copolymer is from 15:85 to 30:70. The preferred ratio of methyl acrylate to acrylic acid is 25:75 by weight. The methyl acrylate-acrylic acid copolymer is formed by reacting methyl acrylate and acrylic acid (generally glacial acrylic acid) in an excess amount of water and in the presence of a thioglycolic acid carrier, which is present in the concentration of 5–20% by weight of the copolymer, preferably 10–15% by weight. This mixture is then cooled to 25°–30°C and then the reaction is initiated with an aqueous solution of a free radical initiator. The preferred free radical initiator useful in this invention is ammonium persulfate. The free radical initiator concentration is from 2 to 15% by weight based upon the weight of the copolymer. Generally, the catalyst solution is rapidly added to the reactants within 1 minute.

A strong exotherm is apparent after the addition of the catalyst. The temperature rises to between 100°–110°C, after which the polymer solution must be cooled to within the range of 45°–55°C. The polymer solution has a pH within the range of 3–5. The pH is adjusted to about 7 with an alkali metal hydroxide, generally sodium hydroxide or potassium hydroxide. The temperature of the polymer is maintained in the range of 45°–55°C.

It has been found that the methyl acrylate and acrylic acid copolymer also may be used in combination with sodium polyphosphates to achieve even greater dispersing properties for high solids suspensions. It has been determined that from 0.05 to 0.5% by weight of the polyphosphates should be used based on the weight of the polymer. The preferred polyphosphate is sodium hexametaphosphate.

Following are examples of the preparation of the dispersant and its subsequent use in high solids suspensions.

EXAMPLE 1

A 1000 ml. three-necked flask fitted with a stirrer, thermometer, and a reflux condenser was charged with 208 grams of glacial arcylic acid and 250 ml. of water. To this mixture was added 55 grams of methyl acrylate and an additional 200 ml. of water. The total charge was mixed thoroughly. Then 20.8 grams of thioglycolic acid was carefully added to the reaction charge with mixing and the reactor charge was then cooled to 20°–25°C. A catalyst solution of 14 grams of ammonium persulfate in 30 ml. of water was charged to the reactor within 30 seconds. The temperature of the reaction vessel contents increased to 109°C. The reaction vessel was fitted with an ice bath to maintain the temperature below 80°C, and then was cooled to 50°C.

To the reaction vessel, 138.4 grams of a 50% sodium hydroxide solution was rapidly added with vigorous agitation. The reaction vessel was again cooled to 50°C. Then, 100 grams of methanol was added and the resultant mixture was stirred for 30 minutes.

EXAMPLE 2

A three-drum pilot reactor was charged with 416 lbs. of glacial acrylic acid and 60 gallons of water. Then 150 lbs. of methyl acrylate and 50 lbs. of water were added with agitation. 41.6 lbs. of thioglycolic acid was added to the reactor with agitation and the reactor was cooled to 20°C. Then, 90 lbs. of a 30% ammonium persulfate catalyst solution was added to the reactor within one minute. The temperature of the reactor contents increased to 108°C and was then cooled to 50°C. Then 280 lbs. of a 50% tank car caustic was rapidly added to the reactor while the temperature was maintained at 70°–80°C. After the caustic addition the temperature was reduced to 50°C. Two hundred lbs. of methanol was added and the polymer solution was mixed for 1 hour.

EXAMPLE 3

The polymer solutions prepared in Examples 1 and 2 were tested in slurries of naturally occurring calcium carbonate and were compared to other well-known dispersants such as polyacrylic acid and sodium hexametaphosphate. One percent by weight solutions of the polymers of Examples 1 and 2 as well as polyacrylic acid and sodium hexametaphosphate were prepared. The slurries were 60% solids. These dispersants were added to samples of the slurries in various concentrations with agitation for 10 minutes. Then, the viscosity was measured using a No. 6 spindle at 100 rpm. The results are shown in Table I below.

TABLE I

| Dosage (% on dry pigment) | BROOKFIELD VISCOSITY (CENTIPOISE) | | | |
|---|---|---|---|---|
| | Example 1 | Example 2 | Polyacrylic Acid | Sodium Hexametaphosphate |
| 0.2 | — | 6000 | 9000 | — |
| 0.4 | 3000 | 2500 | 4800 | — |
| 0.6 | 650 | 625 | 1200 | — |
| 0.8 | 450 | 410 | 700 | 1500 |
| 1.0 | 350 | 300 | 500 | — |
| 1.2 | 320 | 300 | 500 | — |
| 1.4 | 320 | 300 | 480 | — |

These results illustrate the reduction of viscosity of the copolymers of this invention as compared to polyacrylic acid and sodium hexametaphosphate. Therefore, the Table readily illustrates the improved dispersing properties of the copolymer.

The following table illustrates further tests using another commercially available calcium carbonate slurry. The results cannot be compared directly to the results in Table I, since the physical properties of different calcium carbonate pigments vary. The importance in the tables is the comparison between the different chemicals using the identical slurry.

TABLE II

| Dosage (% on dry pigment) | BROOKFIELD VISCOSITY (CENTIPOISES) | | | |
|---|---|---|---|---|
| | Example 1 | Example 2 | Example 1 Plus Sodium Hexametaphosphate | Sodium Hexametaphosphate |
| 0.1 | — | — | 600 | — |
| 0.2 | 5000 | 4800 | 280 | — |
| 0.3 | 2000 | 2100 | 290 | 6000 |
| 0.4 | 370 | 360 | 290 | 4000 |
| 0.6 | 260 | 240 | 260 | 1200 |
| 0.8 | 280 | 240 | 270 | 590 |
| 1.0 | 250 | 240 | 250 | 480 |

From these examples, the wide use and application of the invention is quite apparent and its advantage over the prior art is aptly demonstrated.

What is claimed is:

1. An improved method for rapidly dispersing high solids suspensions having from 50–80% by weight of soilds which comprises adding from 0.2–1.4% by weight of a dispersant formed by the copolymerization of methyl acrylate and acrylic acid to said high solids suspensions wherein the weight ratio of methyl acrylate to acrylic acid is from 15:85 to 30:70.

2. The method of claim 1 in which the dispersant has a molecular weight of from 5,000 to 15,000.

3. The method of claim 1 in which the high solids suspensions is from 50 to 80% by weight solids.

4. The method of claim 1 in which the weight ratio of methyl acrylate to acrylic acid is 25:75.

5. The method of claim 1 in which the dispersant has been neutralized to a pH of 7.

6. The method of claim 1 in which the high solids suspensions is a paper coating pigment suspension.

7. The method of claim 6 in which the paper coating pigment suspension is a calcium carbonate suspension.

8. The method of claim 1 in which the dispersant also contains sodium polyphosphate.

* * * * *